UNITED STATES PATENT OFFICE.

KARL KREKELER, ADOLF ISRAEL, AND AUGUST BLANK, OF ELBERFELD, GERMANY, ASSIGNORS TO THE FARBENFABRIKEN OF ELBERFELD COMPANY, OF NEW YORK, N. Y.

BLACK TRISAZO DYE.

SPECIFICATION forming part of Letters Patent No. 602,857, dated April 26, 1898.

Application filed November 4, 1897. Serial No. 657,376. (Specimens.) Patented in Germany September 15, 1891, No. 65,262; in England December 28, 1891, No. 22,641; in France April 28, 1892, No. 221,233; in Italy June 30, 1892, XXVI, 32,191, and LXIII, 186, and in Austria-Hungary October 3, 1892, No. 1,242 and No. 16,870.

*To all whom it may concern:*

Be it known that we, KARL KREKELER, ADOLF ISRAEL, and AUGUST BLANK, doctors of philosophy, subjects of the German Emperor, (assignors to the FARBENFABRIKEN OF ELBERFELD COMPANY, of New York,) residing at Elberfeld, Germany, have invented a certain new and useful Improvement in the Manufacture of Black Trisazo Dye, (for which the Farbenfabriken, vormals Fr. Bayer & Co., of Elberfeld, Germany, has already obtained Letters Patent in Germany, No. 65,262, dated September 15, 1891; in England, No. 22,641, dated December 28, 1891; in France, No. 221,233, dated April 28, 1892; in Italy, Reg. Gen., Vol. XXVI, No. 32,191, Reg. Att., Vol. LXIII, No. 186, dated June 30, 1892, and in Austria-Hungary, No. 1,242 and No. 16,870, dated October 3, 1892;) and we hereby declare the following to be a clear and exact description of our invention.

Our invention relates to the production of a new class of black trisazo dyestuffs by, first, combining one molecule of a tetrazotized paradiamin—such as benzidin, tolidin, dianisidin, or the like—with one molecule of alpha-naphthylamin-beta-monosulfo-acid (1.6 or 1.7) or of salts thereof; secondly, diazotizing the resulting intermediate product; thirdly, coupling the tetrazo compound thus obtained with one molecule of 1.8 dioxynaphthalene, 4 monosulfo-acid or of salts thereof, and, finally, combining the body thus obtained which contains still one free diazo group with a metadiamin of the benzene series—such as metaphenylenediamin, metatoluylenediamin, or the like. The dyestuffs thus obtained represent when dry and pulverized dark powders, which dissolve in water with violet-gray to violet-black color and yield on unmordanted cotton violet-black shades, which when treated with solutions of chromium and copper-salts change into black, fast to washing.

In carrying out our new process practically we can proceed as follows: 21.2 kilos, by weight, of tolidin are diazotized in the usual manner by means of sixty kilos, by weight, of a concentrated hydrochloric acid (containing thirty per cent. of HCl) and fourteen kilos, by weight, of sodium nitrite, keeping the temperature at zero. Into the resulting liquid a solution prepared by dissolving twenty-seven kilos, by weight, of the sodium-salt of alpha-naphthylamin-beta-sulfo-acid (1.6 or 1.7) and thirty kilos, by weight, of sodium acetate ($NaC_2H_3O_2 + 3H_2O$) in three hundred liters of warm water and subsequent cooling to zero by means of ice is added with stirring. If the formation of the intermediate product which separates in the shape of a dark precipitate is finished, the mixture is acidulated by means of fifty kilos, by weight, of a thirty-per-cent. hydrochloric acid, and a solution of 7.5 kilos, by weight, of sodium nitrite is added in order to diazotize the free amido group still contained in the intermediate product. After stirring the reaction mixture for several hours the formation of the tetrazo compound will be completed. Subsequently a solution prepared by dissolving 26.5 kilos, by weight, of 1.8 dioxynaphthalene, 4 sulfonate of sodium, and seventy kilos, by weight, of sodium acetate in one thousand liters of water is added with continuous stirring. If the combination of the tetrazo compound with the dioxynaphthalene sulfo-acid is finished, a solution of 12.2 kilos, by weight, of meta-toluylenediamin in two hundred liters of water is added. The resulting mixture is stirred for about twelve hours and subsequently rendered alkaline by adding forty-seven kilos, by weight, of sodium carbonate. Finally, the separated dyestuff is filtered, pressed, and dried. It is the sodium salt of an acid having most probably the structural formula:

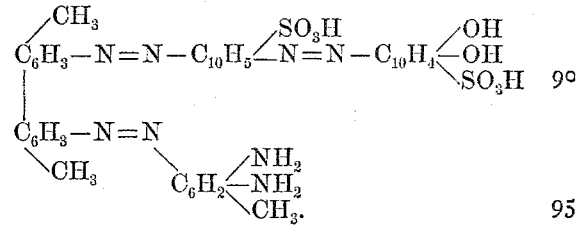

The dyestuff represents when dry and pulverized a dark powder, which is soluble in water with a violet-gray color. In concentrated sulfuric acid it dissolves with a blue color, from which solution a violet-black precipitate is obtained on adding a sufficient quantity of ice.

The new coloring-matter dyes unmordanted cotton violet-black shades. On treating the thus-dyed fibers with solutions of chromium and copper salts greenish-black shades fast to washing are produced.

Having now described our invention and in what manner the same is to be performed, what we claim as new, and desire to secure by Letters Patent, is—

1. The process for producing new trisazo dyestuffs by first combining one molecule of a tetrazotized paradiamin such as benzidin, tolidin, dianisidin, with one molecule of a beta-monosulfo-acid of alphanaphthylamin such as 1.6 and 1.7, secondly diazotizing the resulting intermediate product, thirdly coupling the tetrazo compound thus obtained with one molecule of 1.8 dioxynaphthalene, 4 monosulfo-acid and finally combining the body thus produced, which contains still one free diazo group, with a metadiamin of the benzene series such as metaphenylenediamin, substantially as described.

2. The process for producing a new trisazo coloring-matter by first combining in equimolecular proportions a tetrazoditolyl salt and a beta-monosulfo-acid of alphanaphthylamin such as 1.6 and 1.7, secondly diazotizing the resulting intermediate product, thirdly coupling the tetrazo compound thus obtained with one molecule of 1.8 dioxynaphthalene, 4 monosulfo-acid and finally combining the body thus produced which contains still one free diazo group with metatoluylenediamin, substantially as described.

3. As new article of manufacture the new trisazo dyestuffs derived from the diazotized intermediate product from a tetrazotized paradiamin such as benzidin tolidin, dianisidin, with one molecule of a beta-monosulfo-acid of alphanaphthylamin by combination with first one molecule of 1.8 dioxynaphthalene, 4 monosulfo-acid and subsequently with one molecule of a metadiamin of the benzidin series such as metaphenylenediamin, or metatoluylenediamin, representing dark powders soluble in water with violet-gray to violet-black color and yielding on unmordanted cotton violet-black shades which, when treated with solutions of chromium and copper salts change into black fast to washing, substantially as described.

4. As a new article of manufacture the specific dyestuff derived from the diazotized intermediate product from one molecule of tetrazoditolyl with one molecule of a beta-monosulfo-acid of alphanaphthylamin by combination with first: one molecule of 1.8 dioxynaphthalene, 4 monosulfo-acid and subsequently with one molecule of metatoluylenediamin, being an alkaline salt of an acid having most probably the formula:

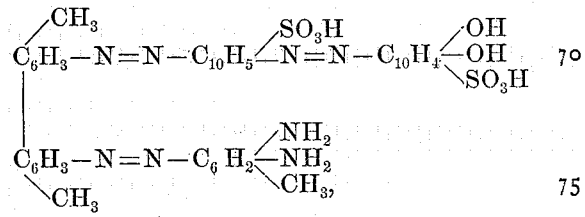

representing a dark powder dissolving in water with a violet-gray color, soluble in concentrated sulfuric acid with a blue color from which solution a violet-black precipitate is obtained on the addition of ice, yielding on unmordanted cotton violet-black shades which when treated with solutions of chromium and copper salts change into greenish-black fast to washing, substantially as described.

In testimony whereof we have signed our names in the presence of two subscribing witnesses.

KARL KREKELER.
ADOLF ISRAEL.
AUGUST BLANK.

Witnesses:
R. E. JAHN,
OTTO KÖNIG.